United States Patent
Gopalakrishnan et al.

(10) Patent No.: US 10,956,107 B1
(45) Date of Patent: Mar. 23, 2021

(54) METHODS AND SYSTEMS FOR KEYWORD-BASED PRINTING

(71) Applicant: XEROX CORPORATION, Norwalk, CT (US)

(72) Inventors: Sainarayanan Gopalakrishnan, Chennai (IN); Srinivasarao Bindana, Kakinada (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/811,439

(22) Filed: Mar. 6, 2020

(51) Int. Cl.
*G06F 3/12* (2006.01)

(52) U.S. Cl.
CPC .......... *G06F 3/1265* (2013.01); *G06F 3/1204* (2013.01)

(58) Field of Classification Search
None
See application file for complete search history.

(56) References Cited

U.S. PATENT DOCUMENTS

| | | | |
|---|---|---|---|
| 9,946,925 B2* | 4/2018 | Mori | G06F 3/1261 |
| 2008/0037065 A1* | 2/2008 | Kawata | G06F 21/608 |
| | | | 358/1.16 |
| 2013/0163025 A1* | 6/2013 | Minamizono | G06F 3/1261 |
| | | | 358/1.13 |
| 2014/0139861 A1* | 5/2014 | Minamizono | G06F 3/1261 |
| | | | 358/1.13 |
| 2015/0254024 A1* | 9/2015 | Fruin | G06F 3/1285 |
| | | | 358/1.15 |
| 2016/0269587 A1* | 9/2016 | Garces | G06K 15/4065 |

* cited by examiner

*Primary Examiner* — Dung D Tran

(57) ABSTRACT

The disclosure discloses methods and systems for keyword-based printing. The method includes receiving a request for printing a document. A user interface including a keyword-based printing option is provided. The keyword-based printing option allows a user to submit one or more pages having one or more keywords for printing separately than other pages of the document for printing. Based on the selection of the keyword-based printing option, the one or more keywords are received. A separate media selected for printing the pages having the one or more keywords than a media selected for printing other pages of the document is received. The pages having the one or more keywords are identified. The pages having the keywords and the separate media selected for the pages along with other pages of the document and the media selected for the other pages of the document are sent for printing.

22 Claims, 6 Drawing Sheets

METHODS AND SYSTEMS FOR KEYWORD-BASED PRINTING

TECHNICAL FIELD

The presently disclosed subject matter relates to the field of printing, and more particularly to methods and systems allowing a user to submit one or more pages having one or more keywords separately than remaining pages of a document.

BACKGROUND

Typically, a user submits a document for printing via a print driver running on a computing device. Several options are provided in the print driver for submitting the document for printing. For example, the print driver allows the user to submit all pages for printing via print all pages option. In another example, the print driver allows the user to submit current page via print current page option. In another example, the print driver allows the user to submit specific pages for printing based on page number selection, ranges or areas via custom print option. In further example, the print driver allows the user to submit only odd pages or even pages for printing. In all cases, the pages are printed with the same media such as A4, A3, letter or the like. Sometimes, the user might be researching on a topic based on some keywords and pages with those keywords are important than other pages. In such cases, the user may want to print the pages with keywords differently or on a different paper for example, paper with better quality paper. But it is difficult for the user to keep the required pages from a single document separately and printing them on different type of papers using existing solutions. According to existing solutions, the user searches for the keyword manually, separates those pages and then prints them as per the requirement. Sometimes, there is a requirement where the user wishes to print some pages having specific keywords of his choice differently than remaining pages of the document. In view of this, there is a need for methods and systems to print important pages or pages having specific keywords differently than other pages of the document.

SUMMARY

According to aspects illustrated herein, a method for submitting a document for printing is disclosed. The method is implemented at a print driver of a computing device. The method includes receiving, by a print driver, a request for printing a document from a user, wherein the document includes one or more pages; providing, by the print driver, a user interface including a keyword-based printing option for selection, wherein the keyword-based printing option allows the user to separately submit one or more pages having one or more keywords for printing than other pages of the document for printing; based on the selection of the keyword-based printing option, receiving, by the print driver, the one or more keywords from the user, via the user interface; receiving, by the print driver, a separate media selection for printing the one or more pages having the one or more keywords than a media selection for printing other pages of the document, via the user interface; identifying, by the print driver, the one or more pages having the one or more keywords as input by the user; and sending, by the print driver, the one or more pages having the one or more keywords and the separate media selected for the one or more pages along with other pages of the document and the media selected for the other pages of the document, for printing.

According to further aspects illustrated herein, a print driver for submitting a document for printing is disclosed. The print driver is running on a computing device to: receive a request for printing a document from a user, wherein the document includes one or more pages; provide a user interface including a keyword-based printing option, wherein the keyword-based printing option allows the user to separately submit one or more pages having one or more keywords for printing than other pages of the document for printing; based on the selection of the keyword-based printing option, receive the one or more keywords from the user, via the user interface; receive a separate media selection for printing the one or more pages having the one or more keywords than a media selection for printing other pages of the document, via the user interface; identify the one or more pages having the one or more keywords as input by the user; and send the one or more pages having the one or more keywords and the separate media selected for the one or more pages along with other pages of the document and the media selected for the other pages of the document, for printing.

According to additional aspects illustrated herein, a system for submitting a document for printing is disclosed. The system includes: a print driver running on a computing device to: receive a request for printing a document from a user, wherein the document includes one or more pages; provide a user interface including a keyword-based printing option, wherein the keyword based printing option allows the user to separately submit one or more pages having one or more keywords for printing than other pages of the document for printing; based on the selection of the keyword-based printing option, receive the one or more keywords from the user, via the user interface; receive a separate media selection for printing the one or more pages having the one or more keywords than a media selection for printing other pages of the document, via the user interface; identify the one or more pages having the one or more keywords as input by the user; and send the one or more pages having the one or more keywords and the separate media selected for the one or more pages along with other pages of the document and the media selected for the other pages of the document, for printing. The system includes a multi-function device communicatively coupled to the print driver, the multi-function device to print the one or more pages having one or more keywords with the separate media than the media for printing other pages of the document.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
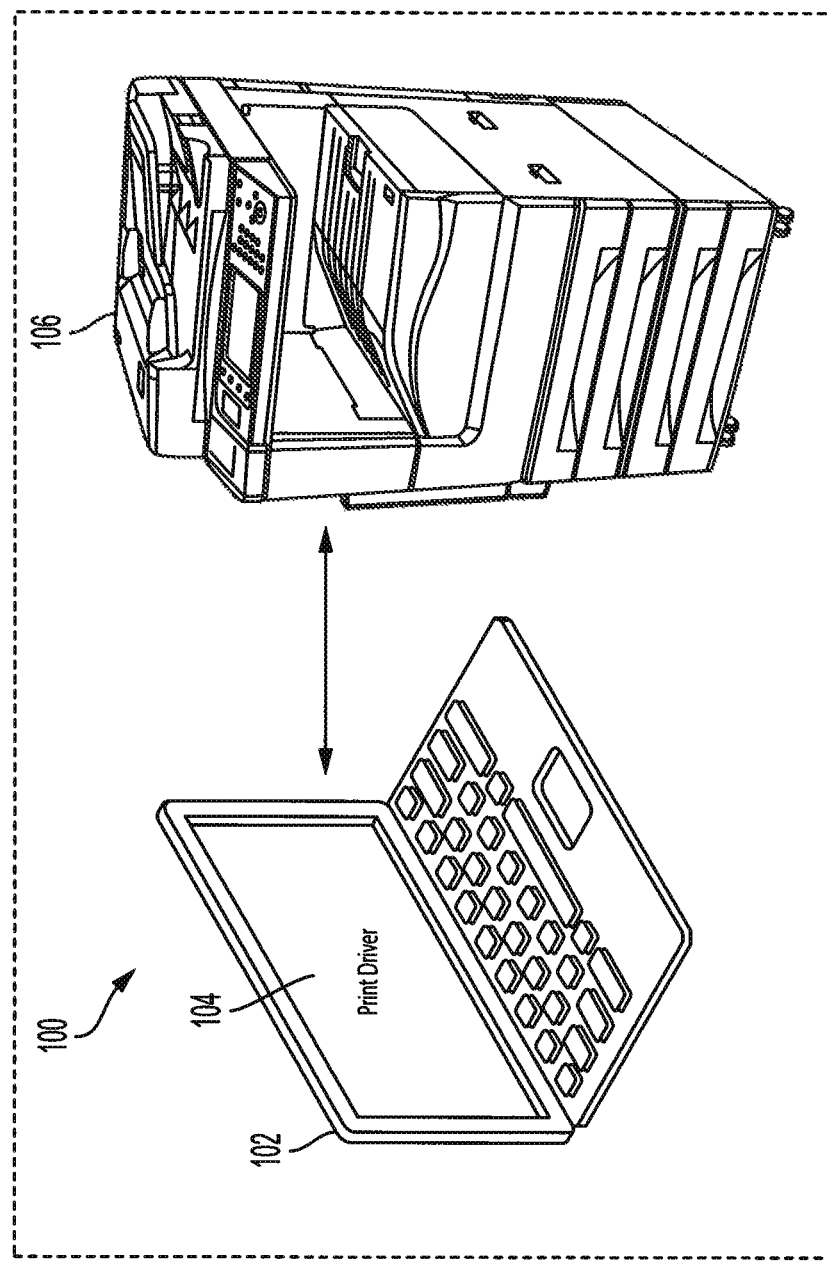
FIG. 1 shows an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples than just provided below.

The term "computing device" refers to a device that a user typically uses for giving print commands and other purposes. Examples of the computing device include, but are not limited to, a personal computer, a desktop, a laptop, a mobile phone, a tablet, a Personal Digital Assistant (PDA), a smart-phone or any other device capable of data communication. The computing device includes a print driver application that allows the user to submit print commands, one or more print parameters and a document for printing. In context of the present disclosure, the print driver application includes a keyword-based printing option that allows a user to print pages having specified keywords differently than remaining pages of the document. For example, the pages having specified keywords can be printed on different media size such as A3 than remaining pages of the document printed on media size such as A4. In another, example, the pages having specified keywords can be printed on different media type such as glossy paper than remaining pages of the document such as plain white paper.

As used herein, a "multi-function device" is a single device or a combination of multiple devices, to perform one or more functions such as, but not limited to, printing, imaging, scanning, and so forth. The multi-function device may include software, hardware, firmware, and combination thereof. In the context of the current disclosure, the multi-function device prints the pages having specified keywords differently than remaining pages of the document. In some scenarios, the multi-function device allows a user to print pages having specified keywords differently than remaining pages of the document as discussed above.

The term "document" refers to any document including a plurality of pages. The document can be in a virtual or software form (embodied in a software file). The virtual form can also be referred to as digital form, electronic version or the like. The document may be an input to the print driver application or the multi-function device.

The term "keywords" refer to one or more keywords which are input/specified by the user to find pages having those keywords. The keywords may be in the form of text, numeric, alphanumeric, image, graphics, or a combination of these. The keywords are important for the user. The pages having the specified keywords are the pages of interest to the user.

The "remaining pages" refer to pages of the document for printing which may not have keywords as specified by the user. For example, if the user submits a document for printing having 5 pages; of the 5 pages, 2 pages having keywords as specified by the user and other 3 pages are referred to as remaining pages of the document for printing.

Overview

The present disclosure discloses methods and systems to print pages having specified keywords differently than other pages of a document, for printing. The methods and systems propose a new feature to print keyword-based pages with a different media i.e., special paper and remaining pages are printed with default media or default tray setting paper.

The present disclosure provides an easy approach to print a single document on different sizes of media directly from a single print. The methods and systems allow printing with selected keywords on a special or a different media. For example, if a user is searching on the Internet for project related stuff and he wants to print pages having specific keywords on a special paper or size or on different quality paper, the methods and systems allow the user to do so directly from the print set up panel i.e., via a print driver. The methods and systems allow the users to easily identify and skip to pages of interest when reviewing the printed document, thereby helps in faster document review.

Exemplary Environment

FIG. 1 shows an exemplary environment 100 in which various embodiments of the disclosure can be practiced. The environment 100 includes a physical computing device 102 having a print driver 104, communicatively coupled to a multi-function device 106. A user typically uses the computing device 102 for his daily tasks such as emails, surfing, work, chatting, prints etc. Examples of the computing device 102 include, but are not limited to, a personal computer, a laptop, a mobile phone, a tablet, a Personal Digital Assistant (PDA), a smart-phone or any other device capable of data communication. The computing device 102 is coupled to the multi-function device 106 through a communication network (although not shown). The communication network may be a wireless network, a wired network or a combination thereof. The communication network may be implemented as one of the different types of networks, such as intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network may include a variety of network devices, including routers, bridges, servers, computing devices, storage devices, and the like. The computing device 102 and the multi-function device 106 collectively forms a system.

The computing device 102 runs several applications and software for functioning of the computing device 102. One such example is a print driver 104. The print driver 104 allows a user to give print commands and submit a document for printing. The print driver 104 further allows the user to provide a number of parameters for printing such as print all pages, print selected pages, double-sided print, single-sided print, job type, quality, destination and so on. The print driver 104 then submits the document to any device for printing such as the multi-function device 106.

The document includes one or more pages. The document may be a large document including various content types such text, image, graphics. Some pages may have content which is highly relevant for the user. Various formats of the document include, but are not limited to, Portable Document Format (PDF), Microsoft DOC format, Hypertext Markup Language (HTML) format, Extensible Markup Language (XML) format, Microsoft XLS format, and Tag Image File Format (TIFF) without limiting the scope of disclosure.

In context of the present disclosure, the print driver 104 includes an option that allows the user to print some pages separately than other pages of the document, based on keywords as specified by the user. The option is provided at the time of setting up print options. For example, printing the pages with specified keywords may include printing those pages on a different media size. In another example, printing the pages with specified keywords may include printing those pages on a special media. In further example, printing the pages with specified keywords may include printing on a different media type.

In the print setup/print driver 104, the user is provided with all the regular options and the proposed option to choose print pages with keywords. As user selects the option to print the pages with specified keywords, it also provides an option to select media i.e., a tray to print those pages and a size of paper the user wants to print on. The pages with specified keywords can be printed on a different media type such as glossy, transparent etc. The print driver 104 receives the one or more keywords from the user. The print driver 104 further receives a media (media type, media size, media tray etc.) from the user he wishes to print the pages having those keywords. Based on the received keywords, the print driver 104 searches for the one or more keywords in the document and identify one or more pages having the specified keywords. The print driver 104 sends the pages having those keywords, the selected media for those pages along with other pages for printing with default media option to the multi-function device 106.

The multi-function device 106 receives the pages having those keywords, the selected media for those pages along with other pages for printing with default media option. The multi-function device 106 prints the pages having the specified keywords on a different media than other pages. For example, the pages with specified keywords are printed on letter head and other pages of the document are printed on A4. In this manner, the present disclosure provides a feature where some pages of the document that are important for the user are considered separately.

The one or more keywords may be text, numeric, alphanumeric, image, graphics or the like. For example, if the keyword is "crypto currency", then all pages having the phrase "crypto currency" are printed separately. For example, the keyword can be numeric such as employee code, user identifier, or the like. In another example, the keyword can be any image such as logo, diagram or any other picture. The user can upload the image via the print driver 104. Similarly, the keyword can be logo, design, or the like. The user can upload the graphics via the print driver 104.

In scenario of FIG. 1, the document is submitted from the computing device 102. The document may be stored on the computing device 102 or may be downloaded on the computing device 102 from his email, cloud, USB or the like. But in other scenarios, the document from which the specific content to be printed is available in an external storage device such as Universal Serial Bus (USB), a hard disk, etc., or in a memory of the multi-function device 106 or may be downloaded from a network or stored over a shared location accessible through the multi-function device 106. In such scenarios, the multi-function device 106 includes a keyword-based printing option that allows the user to separately submit/print pages based on one or more keywords of his choice. The multi-function device 106 is shown in FIG. 2.

Figure 2:
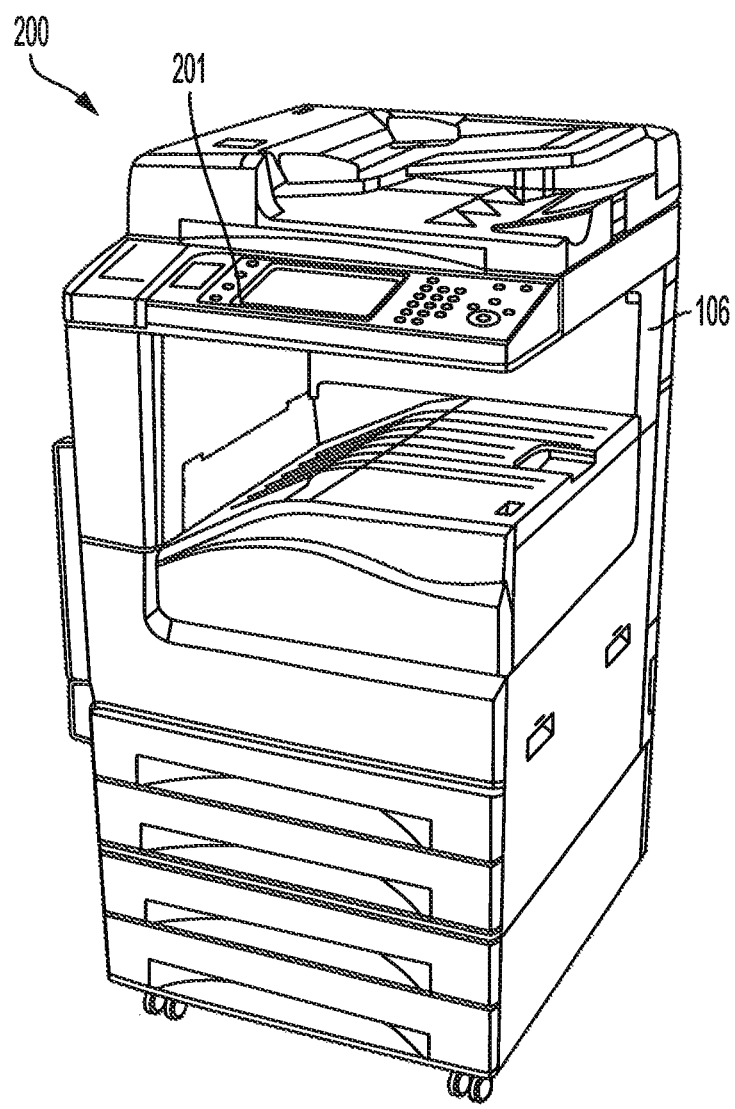
FIG. 2 shows an exemplary physical multi-function device for implementing the present disclosure.

FIG. 2 shows another exemplary environment 200 in which various embodiments of the disclosure can be practiced. The environment 200 includes a physical multi-function device 106, in accordance with an embodiment of the present disclosure. The multi-function device 106 may be used by a number of users for one or more services such as print, email, scan, workflows, copy, fax, or the like. The multi-function device 106 may be a single device or a combination of multiple devices to perform one or more functions such as, but not limited to, printing, scanning, emailing, imaging, photocopying, and so forth. The multi-function device 106 may include software, hardware, firmware, or a combination thereof. As depicted, the multi-function device 106 is a standalone device but the multi-function device 106 may be a part of a network without limiting the scope of the disclosure. As shown, the multi-function device 106 includes a user interface 201. In scenarios of FIG. 2, the document from which specific content is to be selected and submitted is accessible via the multi-function device 106.

The user selects the document through the multi-function device 106. After selecting the document, the user interface 201 is provided. In context of the present disclosure, the user interface 201 provides a keyword-based printing option. The user provides one or more keywords, and media selection for printing pages having the one or more keywords, through the user interface 201. Upon receiving, the multi-function device 106 searches the keywords in the document, identify the pages having the keywords and separates the pages having those keywords from other pages of the document. The multi-function device 106 finally prints the pages having the keywords with the media different from media for other pages of the document.

Exemplary System Components

Figure 3:
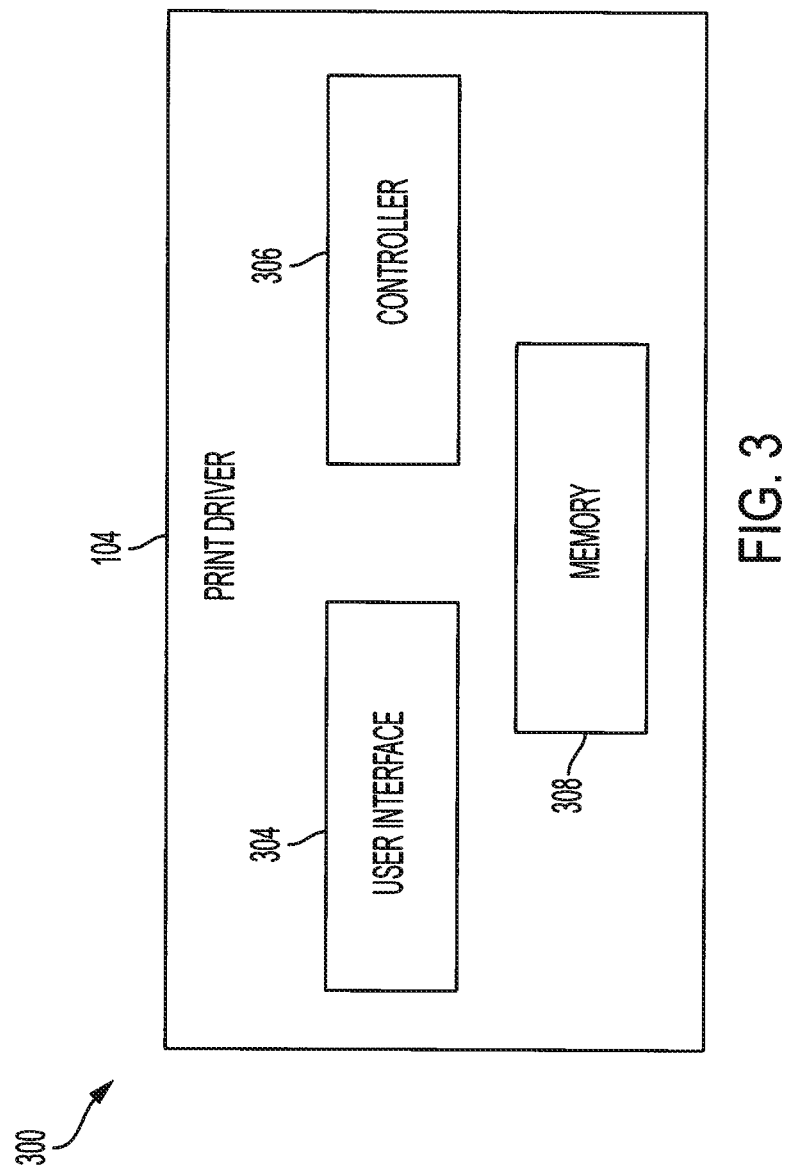
FIG. 3 is a block diagram illustrating various system components of a device, in accordance with an embodiment of the present disclosure.

FIG. 3 is a block diagram 300 illustrating various components of a device such as a computing device 102. In another example, the device may be a multi-function device such as 106. For simplicity, the present disclosure is discussed with respect to the print driver 104 of the computing device 102, but the disclosure can be implemented with respect to the multi-function device such as 106. The computing device 102 includes a print driver 104. The print driver 104 includes a user interface 304, a controller 306, and a memory 308. Each of the components 304-308 is connected to each other via a conventional bus or a later developed protocol. Further, each of the components 304-308 communicates with each other for performing various functions of the present disclosure. The computing device 102 may be communicatively coupled to a multi-function device such as 106.

A user submits a print command to print a document or some pages of the document. The document includes a plurality of pages. The print driver 104 receives the print command from the user. Upon receiving the print command, the user interface 304 is displayed or provided to the user. The user interface 304 includes regular options to print the document. For example, the regular options may be print all pages, print specific pages based on page number selection, print current page and so on. In the regular options, the pages selected for printing are printed with the same media size, type such as A4, plan white paper, respectively etc. Sometimes, the user requires to print some pages having important keywords on a separate media such as a different media size, type, different quality media or the like.

To cater to such requirements, the user interface 304 includes a keyword-based printing option to print pages having specified keywords separately than other pages of the document for printing. The keyword-based printing option is provided or displayed to the user before submitting the document for printing. The selection of the keyword-based printing option requires inputting the one or more keywords from the user and a media selection for pages having the one or more keywords. The keyword-based printing option further includes an option to highlight the specified keywords in the printed version.

Figure 4:
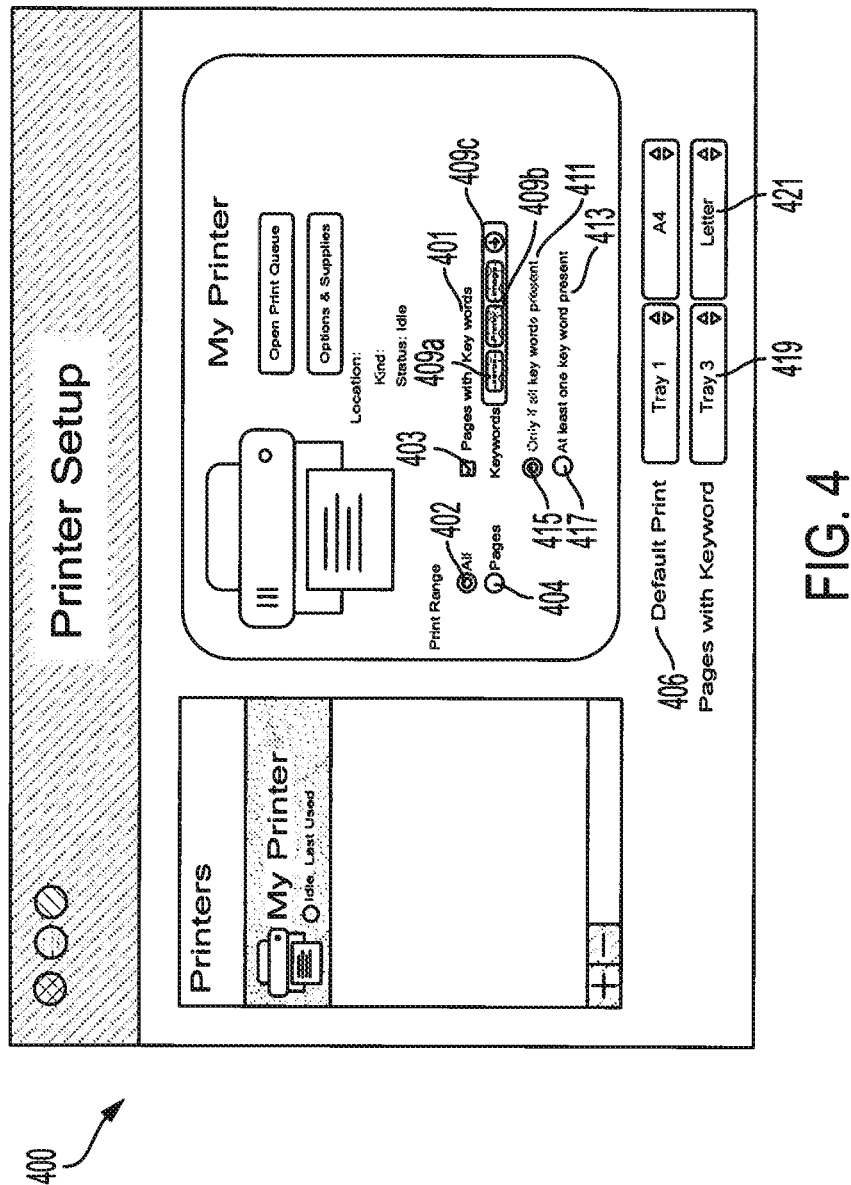
FIG. 4 shows an exemplary user interface of a print driver.

One exemplary snapshot 400 of a user interface of the print driver 104 is disclosed in FIG. 4. The user interface includes print parameters for submitting the document for printing. The user interface includes regular options such as 402, 404, and 406 for submitting the document for printing. In context of the present disclosure, the user interface includes a keyword-based printing option marked as 401. The keyword-based printing option provides an option to the user to separately print pages having specified keywords than other pages of the document. If the user wishes to print pages having some specific keywords separately than other pages, then the user selects the check box 403. To this end, the user interface includes an option pages with keyword which the user can select via a check box. Once selected, the user can provide one or more keywords via a text box. For example, the user has input 3 keywords such as 409a, 409b, 409c and so on. These are few examples, the user can provide more keywords as required. Moreover, the user interface further enables the user to select if he wishes all keywords to be present in the pages (marked as 411) or at least one keyword is present (marked as 413). The user can accordingly choose the option 411 and 413 via radio buttons 415 and 417. After providing the keywords and selecting relevant options, the user interface includes separate tray and media option for printing pages having the keywords. The user can provide tray and media via drop down menus 419 and 421. Along with this, the user interface includes regular option of providing media and tray for printing other pages of the document shown under default print option marked as 406.

The user interface and keyword-based printing options as shown in the snapshot 400 are exemplary in nature and there can be many variations to the options. For example, the keyword-based printing option may further include a sub-option where the user can select whether he wishes to highlight the keywords in the printed version. If selected, the keywords specified by the user are highlighted in the printed version i.e., in the printed one or more pages.

Based on the selection of the keyword-based printing option, the one or more keywords are provided via the user interface 304. The controller 306 receives the one or more keywords as provided by the user via the user interface 304. The controller 306 receives media selection for pages having one or more keywords. The separate media selection may be media size or media type. Few examples of media size include A3, A4, A5, A6, A7, A8 etc. Upon receiving the keywords, the controller 306 searches for the keywords in the document to identify pages having those keywords. Once identified, the controller 306 separates the pages having the keywords from other pages of the document for printing. The controller 306 sends the one or more pages having the one or more keywords and the separate media selected for the one or more pages along with other pages of the document and the media selected for the other pages of the document, for printing.

The multi-function device such as 106 receives the one or more pages having the one or more keywords and the separate media selected for the one or more pages along with other pages of the document and the media selected for the other pages of the document from the print driver 104 in a format understandable and readable by the multi-function device 106. The multi-function device 106 prints the pages having the specified keywords on its corresponding selected media and other pages on its corresponding selected media.

The memory 308 stores page numbers, specifically keyword-based search page numbers only. The memory 308 may store other details/information required to implement the present disclosure.

Although FIG. 3 is discussed with respect to the print driver 104 or the computing device 102, but the device can be a multi-function device 106 for implementing the present disclosure. In such cases, the multi-function device 106 includes a user interface, a controller, and a memory (although not shown). The document to be printed is selected through the multi-function device via an external storage device such as USB, a hard disk, a memory of the multi-function device, a shared location accessible to the multi-function device, and so on. The multi-function device 106 implements all functionalities as discussed above in FIG. 3.

Exemplary Flowchart

Figure 5A:
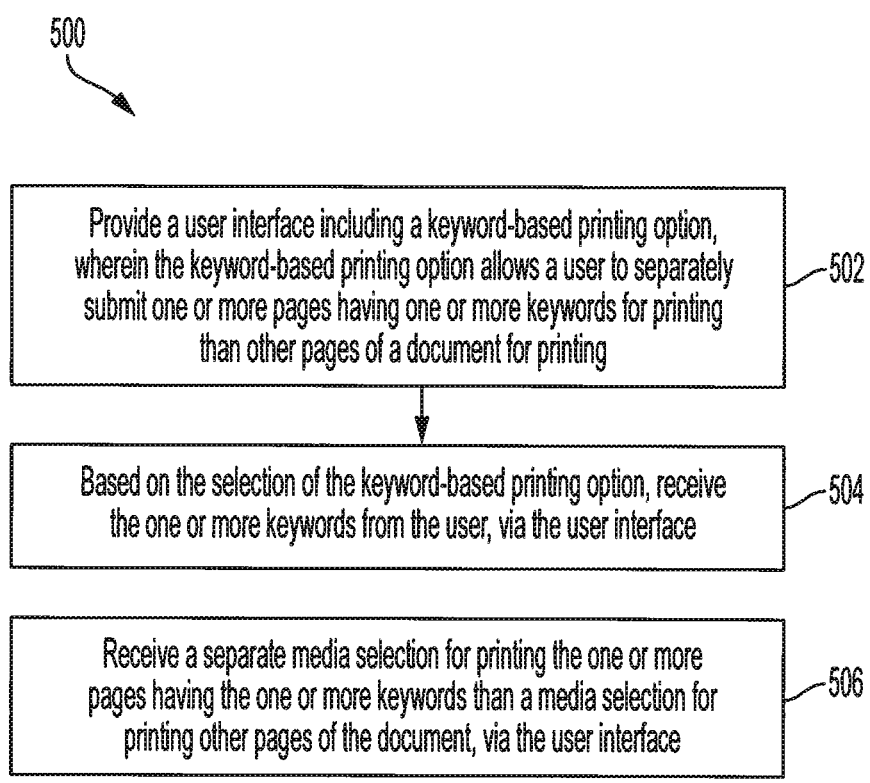
FIGS. 5A-5B represent a flowchart for allowing a user to print pages with specified keywords differently than remaining pages for printing.
Figure 5B:
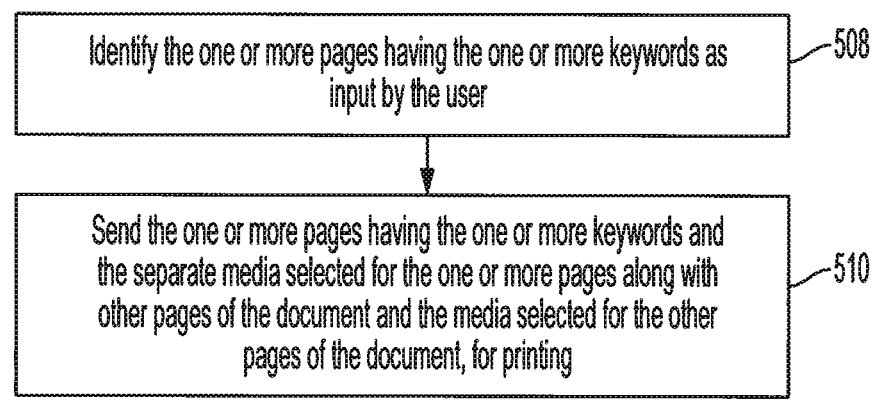

FIGS. 5A-5B illustrate an exemplary method 500 for keyword-based printing. Specially, the method 500 relates to printing pages having specified keywords separately from other pages of a document. The method 500 can be implemented using a combination of a computing device, specifically at a print driver of the computing device and a multi-function device. In other examples, the whole method 500 can be implemented at a multi-function device. In additional examples, the method 500 can be implemented by any other device having print submission capabilities. For easy understanding, the method 500 is discussed with respect to a print driver running on a computing device. But the method 500 may be implemented by a multi-function device or other devices as discussed above.

The method 500 starts when a user wishes to submit a document for printing, the document includes a plurality of pages. The user submits a print command for printing the document. Upon submitting the print command by the user, a print setting user interface is displayed/provided to the user. The print setting user interface includes conventional options for submitting print parameters. Various examples of the print parameters include print all pages, print pages based on page numbers, areas, range or the like. The user selects one of these options for printing via the user interface. For example, the user selects print all pages option.

In context of the present disclosure, the user interface includes a keyword-based printing option. The user interface including a keyword-based printing option is provided to the user for selection at 502. The keyword-based printing option allows the user to separately submit/print one or more pages having one or more keywords than other pages of the document for printing. For example, if the user has a document of 10 pages and he selects to print all pages. After selecting this, the user is provided with an option to separately print one or more pages, for example, 5 pages having important keywords to be printed differently/separately than other 5 pages of the document. The keyword-based printing option provides an option to input the one or more keywords. The keyword-based printing option further provides an option to separately do media selection for printing the one or more pages having the one or more keywords.

If the user selects the keyword-based printing option, the method proceeds further. Else, the method proceeds with the conventional approach by printing all pages with media as selected by the user or with a default media. Here, the user selects the keyword-based printing option. The selection of the keyword-based printing option is received. The selection of the keyword-based printing option requires inputting the one or more keywords from the user and a media selection for printing the pages having the one or more keywords. Based on the selection of the keyword-based printing option by the user, the user provides one or more keywords. The one or more keywords are provided via the user interface. The one or more keywords are important for the user and the user wishes to print all pages having the input keywords differently than other pages of the document. At 504, the one or more keywords as input by the user are received. The user further selects a separate media such as letter head for printing the pages having the one or more keywords. Meaning that the media selected for the pages having one or more keywords is separate than other pages of the document. For example, the media selected for the pages having the one or more keywords is letter head and the media for the other pages is A4. In some cases, default media size and tray are considered for other pages of the document. In addition to the media selection, the user may select an input tray for the pages having the one or more keywords.

At 506, the separate media selection for printing the one or more pages having the one or more keywords than a media selection for printing other pages of the document is received. The separate media selection for the one or more pages having the one or more keywords include at least one of: separate media size selection and separate media type selection. For example, the media selection for the pages having the one or more keywords may have a different size than other pages of the document. For example, the media selected for the pages having the one or more keywords is A3 and the media selected for other pages of the document is A4. In another example, the media selection of the pages having the one or more keywords may have a different media type than other pages of the document. For example, the media selected for the pages having the one or more keywords is transparent, while the media selected for other pages of the document is plain white paper. In further example, the media selected for the pages having the one or more keywords is glossy and the media selected for other pages of the document is plain white paper.

Upon receiving the keywords as input by the user, the one or more keywords are searched for in the document. The keywords are searched in all pages of the document selected for printing. At 508, once searched, the one or more pages having the one or more keywords are identified. Then, the pages having those keywords are separated from other pages of the document for printing. At 510, the one or more pages having the one or more keywords and the separate media selected for the one or more pages along with other pages of the document and the media selected for the other pages of the document is sent to a multi-function device for printing.

The multi-function device receives the one or more pages having the one or more keywords and the separate media selected for the one or more pages along with other pages of the document and the media selected for the other pages of the document. The multi-function device prints the one or more pages having one or more keywords with the separate media than the media for printing other pages of the document. For example, the pages having the keywords specified by the user are printed on letterhead, for example, and other pages of the document are printed on A4 paper.

In some implementations, the multi-function device highlights the specified keywords in the printed version of the one or more pages having the specified keywords. This way, it is easier for the user to review the pages.

An example is discussed for better understanding of the disclosure. It is considered that a user submits a document having 10 pages for printing. The user submits a print command. Upon submitting the print command, a print set-up user interface including one or more options is provided. The user selects print all pages from the print setup user interface. Here, the user wishes to print some pages having keywords of interest separately than other pages of the document. The user selects the keyword-based printing option. The user further inputs the one or more keywords and media size for printing the pages having those keywords, such as invoice and letter head, respectively. The print driver receives the keywords and searches for the keywords and identifies pages having those keywords and separates pages having those keywords from other pages of the document. For example, if the keyword is invoice, the print driver identifies and separates the pages having the phrase "invoice" from other pages of the document. It can be considered that only one page has the keyword invoice so one page having the keyword invoice is separated from other 9 pages of the document. The print driver sends the page having the keyword invoice, letter head media size for the page with the keyword invoice, 9 pages of the document and A4 media size for other 9 pages of the document to a multi-function device for printing. The multi-function device prints the page having the keyword invoice on the letter head and prints other 9 pages of the document on standard A4 sheet. In this manner, the pages having keywords which are important for the user are printed separately, for example, with a different media size, with a different media type, with a different quality media and so on.

The method flowchart 500 as discussed above is exemplary in nature and variations to the flowchart 500 can be implemented. The implementation of the method using a combination of the print driver and the multi-function device is exemplary and other variations may be implemented. For example, the user can simply select the keyword-based printing option, provide keywords, media, tray etc. via the print driver. And the remaining blocks of searching for the specified keywords, identifying pages having the keywords, separating the pages having the specified keywords can be performed at the multi-function device along with printing. In some implementations, the method 500 may be implemented using a combination of a print driver, a server and a multi-function device. For example, the blocks of selection of keyword-based printing option, providing keywords, media, etc. are performed at the print driver. While the blocks of searching for the specified keywords, identifying pages having the keywords, separating the pages having the specified keywords can be performed at a server end. The functionality of printing the pages having the keywords is performed at the multi-function device. In further implementations, the complete flowchart 500 can be implemented at the multi-function device end. In such implementations the document for printing is selected via the multi-function device. These are few ways of implementing the present disclosure, but many more variations to these can be implemented.

The present disclosure may be implemented for scenarios when a user is doing a research based on some keywords and wishes to review pages having those keywords. The present disclosure may be implemented when some pages having specific keywords are important for the user and the user wishes to refer to the keywords and pages having those keywords. The present disclosure provides a fast powerful way to find specific pages from the document.

The present disclosure allows printing pages with specified keywords differently i.e., may be on a different media size, a different media type, and so on. Although, the disclosure is discussed wrt to selection of media size, but the present disclosure can be extended to selection of output trays.

The method 500 may be implemented by non-transitory computer-readable medium storing instructions, which when executed by one or more processors cause the one or more processors to implement the method blocks 502, 504, 506, 508, and 510. For example, the non-transitory computer-readable medium including instructions executable by a processing resource to: receive a request for printing a document from a user, wherein the document including one or more pages; provide a user interface including a keyword-based printing option for selection, wherein the keyword-based printing option allows the user to separately submit one or more pages having one or more keywords for printing than other pages of the document for printing; based on the selection of the keyword-based printing option, receive the one or more keywords from the user, via the user interface; receive a separate media selection for printing the one or more pages having the one or more keywords than a media selection for printing other pages of the document, via the user interface; identify the one or more pages having the one or more keywords as input by the user; and send the one or more pages having the one or more keywords and the separate media selected for the one or more pages along with other pages of the document and the media selected for the other pages of the document, for printing.

Additionally, the non-transitory computer-readable medium including instructions executable by a processing resource to receive a selection of the keyword-based printing option. The non-transitory computer-readable medium including instructions executable by a processing resource to search the one or more keywords in the document. The non-transitory computer-readable medium including instructions executable by a processing resource to separate the one or more pages having one or more keywords as input by the user, from the other pages of the document for printing. The non-transitory computer-readable medium including instructions executable by a processing resource print the one or more pages having one or more keywords with the separate media than the media for printing other pages of the document. The non-transitory computer-readable medium including instructions executable by a processing resource to highlight the one or more keywords in the printed one or more pages.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, identifying, searching, sending, printing, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for submitting a document for printing, the method is implemented at a print driver of a computing device, the method comprising:
   receiving, by a print driver, a request for printing a document from a user, wherein the document comprising one or more pages;
   providing, by the print driver, a user interface comprising a keyword-based printing option for selection, wherein the keyword-based printing option allows the user to separately submit one or more pages having one or more keywords for printing than other pages of the document for printing;
   based on the selection of the keyword-based printing option, receiving, by the print driver, the one or more keywords from the user, via the user interface;
   receiving, by the print driver, a separate media selection for printing the one or more pages having the one or more keywords and a media selection for printing other pages of the document, via the user interface;
   identifying, by the print driver, the one or more pages having the one or more keywords as input by the user; and
   sending, by the print driver, the one or more pages having the one or more keywords and the separate media selected for the one or more pages along with other pages of the document and the media selected for the other pages of the document, for printing.

2. The method of claim 1, further comprising receiving, by the print driver, a selection of the keyword-based printing option.

3. The method of claim 1, further comprising searching, by the print driver, for the one or more keywords in the document.

4. The method of claim 1, further comprising separating, by the print driver, the one or more pages having one or more keywords as input by the user, from the other pages of the document for printing.

5. The method of claim 1, wherein the separate media selection for the one or more pages having the one or more keywords comprising at least one of: separate media size selection and separate media type selection.

6. The method of claim 1, wherein the keyword-based printing option provides an option to separately select media for printing the one or more pages having the one or more keywords.

7. The method of claim 1, wherein the keyword-based printing option provides an option to input the one or more keywords.

8. The method of claim 1, further comprising printing, by a multi-function device, the one or more pages having one or more keywords with the separate media than the media for printing other pages of the document.

9. The method of claim 8, further comprising highlighting, by the multi-function device, the one or more keywords in the printed one or more pages.

10. A non-transitory computer-readable storage medium storing instructions, which when executed by one or more processors cause the one or more processors to:
   receive a request for printing a document from a user, wherein the document comprises one or more pages;
   provide a user interface comprising a keyword-based printing option, wherein the keyword-based printing option allows the user to separately submit one or more pages having one or more keywords for printing than other pages of the document for printing;
   based on the selection of the keyword-based printing option, receive the one or more keywords from the user, via the user interface;
   receive a separate media selection for printing the one or more pages having the one or more keywords and a media selection for printing other pages of the document, via the user interface;
   identify the one or more pages having the one or more keywords as input by the user; and send the one or more pages having the one or more keywords and the separate media selected for the one or more pages along with other pages of the document and the media selected for the other pages of the document, for printing.

11. The non-transitory computer-readable storage medium of claim 10, wherein the instructions when executed by one or more processors cause the one or more processors to further search the one or more keywords in the document.

12. The non-transitory computer-readable storage medium of claim 10, wherein the instructions when executed by one or more processors cause the one or more processors to further separate the one or more pages having one or more keywords as input by the user, from the other pages of the document for printing.

13. The non-transitory computer-readable storage medium of claim 10, wherein the separate media selection for the one or more pages having the one or more keywords comprising at least one of: separate media size selection and separate media type selection.

14. The non-transitory computer-readable storage medium of claim 10, wherein the keyword-based printing option provides an option to separately select media for printing the one or more pages having the one or more keywords.

15. The non-transitory computer-readable storage medium of claim 10, wherein the keyword-based printing option provides an option to input the one or more keywords.

16. The non-transitory computer-readable storage medium of claim 10, wherein the non-transitory computer-readable storage medium is communicatively coupled to a multi-function device for printing the one or more pages having one or more keywords with the separate media than the media for printing other pages of the document.

17. A system for submitting a document for printing, the system comprising:
a print driver running on a computing device to:
receive a request for printing a document from a user, wherein the document comprises one or more pages;
provide a user interface comprising a keyword-based printing option, wherein the keyword based printing option allows the user to separately submit one or more pages having one or more keywords for printing than other pages of the document for printing;
based on the selection of the keyword-based printing option, receive the one or more keywords from the user, via the user interface;
receive a separate media selection for printing the one or more pages having the one or more keywords and a media selection for printing other pages of the document, via the user interface;
identify the one or more pages having the one or more keywords as input by the user; and
send the one or more pages having the one or more keywords and the separate media selected for the one or more pages along with other pages of the document and the media selected for the other pages of the document, for printing; and
a multi-function device communicatively coupled to the print driver, the multi-function device to:
print the one or more pages having one or more keywords with the separate media than the media for printing other pages of the document.

18. The system of claim 17, wherein the separate media selection for the one or more pages having the one or more keywords comprising at least one of: separate media size selection and separate media type selection.

19. The system of claim 17, wherein the keyword-based printing option provides an option to separately select media for printing the one or more pages having the one or more keywords.

20. The system of claim 17, wherein the keyword-based printing option provides an option to input the one or more keywords.

21. The system of claim 17, wherein the print driver is to further separate the one or more pages having one or more keywords as input by the user, from the other pages of the document for printing.

22. The system of claim 17, wherein the multi-function device is to highlight the one or more keywords in the printed one or more pages.

\* \* \* \* \*